United States Patent [19]
Wirth et al.

[11] Patent Number: 4,678,050
[45] Date of Patent: Jul. 7, 1987

[54] MASS AND FORCE METER

[75] Inventors: Johannes Wirth; Mario Gallo, both of Zurich, Switzerland

[73] Assignee: K-Tron Patent AG, Zurich, Switzerland

[21] Appl. No.: 818,138

[22] Filed: Jan. 13, 1986

[30] Foreign Application Priority Data

Jan. 22, 1985 [EP] European Pat. Off. ........ 85810017.5

[51] Int. Cl.⁴ .............................................. G01G 3/08
[52] U.S. Cl. ................................................ 177/229
[58] Field of Search ........................... 177/211, 229; 73/862.65, 862.66

[56] References Cited

U.S. PATENT DOCUMENTS

| 3,135,112 | 6/1964 | Farley | 73/862.65 X |
| 3,994,161 | 11/1976 | Trozera | |
| 4,022,288 | 5/1977 | Canevari | |
| 4,143,727 | 3/1979 | Jacobson | 177/211 |
| 4,179,004 | 12/1979 | Ebbinge | 177/211 |
| 4,338,825 | 7/1982 | Amlani et al. | 73/862.65 |
| 4,505,345 | 3/1985 | Jetter | 177/229 X |
| 4,546,838 | 10/1985 | Ormond | 177/211 |

FOREIGN PATENT DOCUMENTS

| 0016238 | 10/1980 | European Pat. Off. . |
| 0017581 | 10/1980 | European Pat. Off. . |
| 0082250 | 9/1982 | European Pat. Off. . |
| 0080702 | 11/1982 | European Pat. Off. . |
| 353555 | 4/1961 | Switzerland . |

Primary Examiner—George H. Miller, Jr.
Attorney, Agent, or Firm—Parkhurst & Oliff

[57] ABSTRACT

Mass and force meter manufactured from a single block extruded from a profiled bar and comprising several components, with a frame, a load support guided parallely and vertically by guiding means consisting of at least two flat springs mounted one above the other, a motionless measuring system and at least one transmission member that transmits only part of the weight of the mass or part of the force to be measured to the measuring system, in which at least one component implements at least two functions of the meter.

10 Claims, 9 Drawing Figures

MASS AND FORCE METER

The invention relates to a mass and force meter with a frame, a load support guided parallely and vertically by guiding means consisting of at least two flat springs mounted one above the other, a motionless measuring system and a transmission member that transmits only part of the weight of the mass or part of the force to be measured to the measuring system.

Except for the measuring system the whole meter is manufactured from a single block extruded from a profiled bar and comprising several components.

Such meters are known, for instance from U.S. Pat. No. 4,300,648. The main part of the load is compensated by the deformation of the flat springs of the parallel guides. This deformation provokes a deformation of the transmission member which is mounted parallely with the flat springs and the end of which is in contact with the measuring system at a fixed point. It transmits only a very small part of the load to the measuring system.

It is also known to manufacture such meters from a single block except for the measuring system. This block can be obtain for example by extrusion of a bar with a suitable cross-section comprising several components. Each component has one single function as part of the meter. As a consequence the cross-section of the bar to be extended becomes quite complicated. The production process becomes expensive as expensive matrices are required. Because of the complicated cross-section a certain reject rate is unavoidable. A further drawback is the relatively large height of the cross-section which prevents the whole meter to have a flat profile.

It is an object of the invention to provide monoblock meters from an extruded bar having a very simple cross-section which comprises nonetheless all components required for the implementation of all functions of the meter which can still have a small height.

It is another object of the invention to provide a mass and force meter with a frame, a load support, a means for guiding said load support parallely and vertically, said means consisting of at least two flat springs mounted one above the other, a motionless measuring system, at least one resilient transmission member that transmits a part of the load to the measuring system, said flat springs being fitted in said frame and in said load support, said meter consisting of a single extruded profiled block the cross-section of which presents several components of which at least one implements at least two elements of the meter.

Embodiments of the invention are represented schematically in the enclosed drawing.

Figure 5:
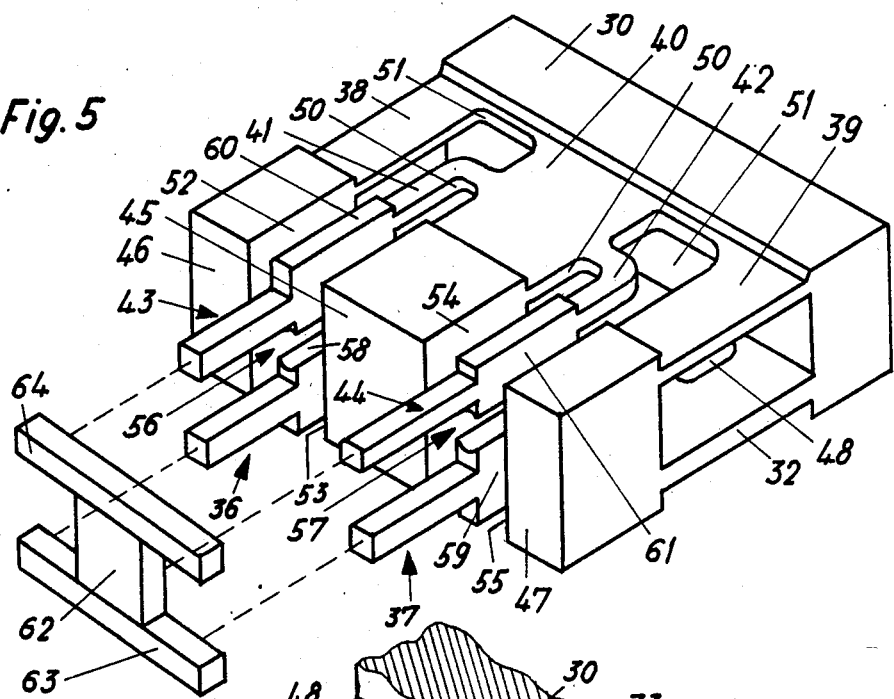
FIG. 5 is a perspective view of a second embodiment using the block of Fir. 4.
Figure 6:
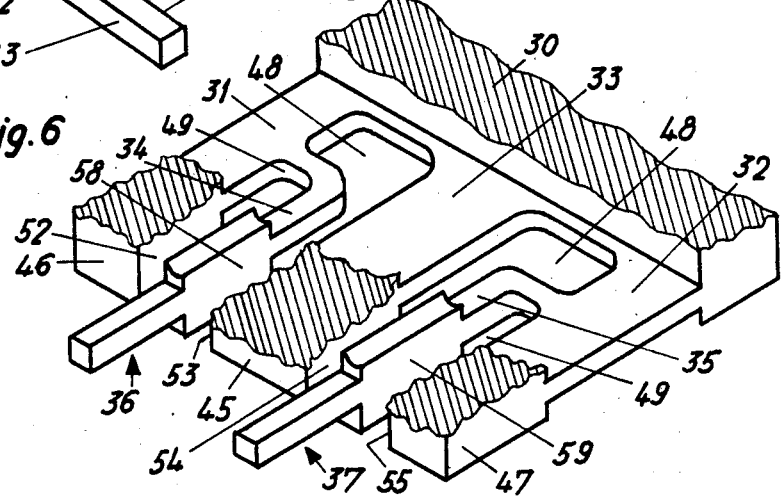
FIG. 6 shows the lower part of FIG. 5.
Figure 7:
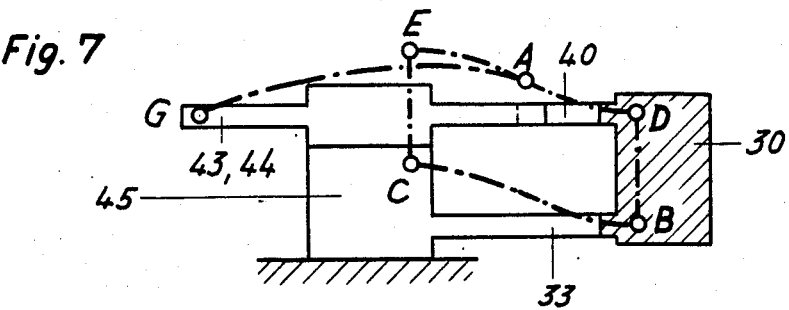

FIG. 7,8 each shows a cross-section of the embodiment of FIG. 5.

Figure 4:
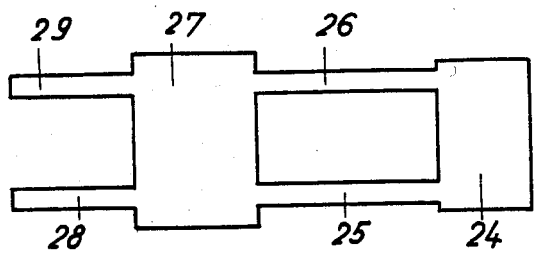
FIG. 4 is a side view of a second block.
Figure 9:
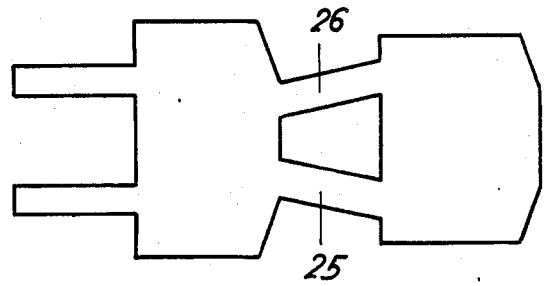

FIG. 9 is a variant to FIG. 4.

Figure 1:
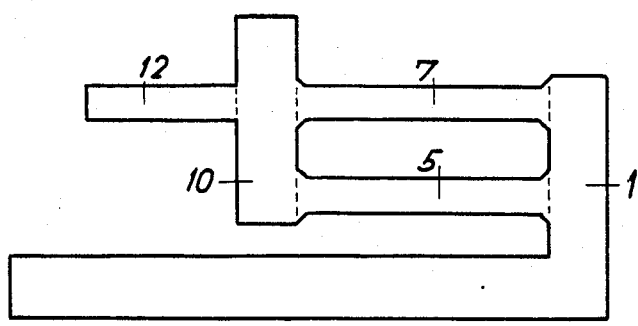
FIG. 1 is a side view of a first block.

The profiled block shown in FIG. 1 has a simple cross-section comprising five components. Each of these components implements one or more elements, i.e. functions of the meter.

The L-shaped component 1 implements the frame 2 of the meter which has a horizontal part 3 and a vertical part 4.

Component 5 forms a flat horizontal spring 6 which implements the lower flat spring of the guiding means and thereby participates to the compensation of the main part of the load to be measured.

Component 7 forms also a flat horizontal spring 8 which implements the upper flat spring of the guiding means as well as a part of the transmission member 9 which will be described later.

Component 10 forms the load support 11, it also forms a part of the transmission member 9.

The last component 12 implements only a part of the transmission member 9.

Some of these components are obtained by machining, e.g. by milling or drilling.

Figure 2:
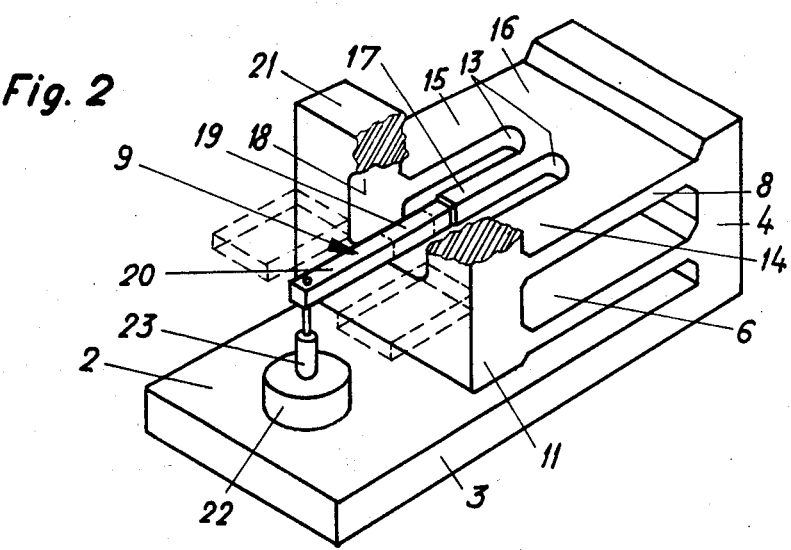
FIG. 2 is a perspective view of a first embodiment using the block of FIG. 1.

As can be gathered from the drawings flat springs 6 and 8 are fitted in frame 2 and in load support 11. Components 1 and 5 practically need no machining. Component 7 exhibits two slots 13 obtained by milling. Flat spring of the guiding means comprises thereby the three strips 14, 15, 16 (FIG. 2).

The middle strip 17 between strip 14 and 15 forms a part of the transmission member 9.

Component 10 exhibits an annular hole 18 of rectangular section obtained by drilling. The middle part 19 of component 10 is connected to strip 17 and forms a prolongation of this strip 17.

Component 12 is machined so that only a strip 20 remains which is connected to part 19 and forms the end of the tansmission member 9. The remainder of component 12 (shown with dashed lines in FIG. 2) is entirely cut away.

The meter obtained from the block of FIG. 1 comprises the following elements:
frame 1 with parts 3 and 4 from component 1,
guiding means consisting of:
  the lower flat spring 6 from component 5,
  the upper flat spring 8 consisting of strips 14, 15, 16 from component 7,
load support 11 from component 10 with the upper surface 21 for receiving the load,
transmission member 9 consisting of strip 17 from component 7, part 19 from component 10 and strip 20 from component 12.

All these elements are formed out of the same original block. The meter is completed with a motionless measuring system 22 fixed to part 3 of the frame 2. The input of this measuring system 22 is linked with the end of the transmission member 9 by means of a rigid rod 23.

Figure 3:
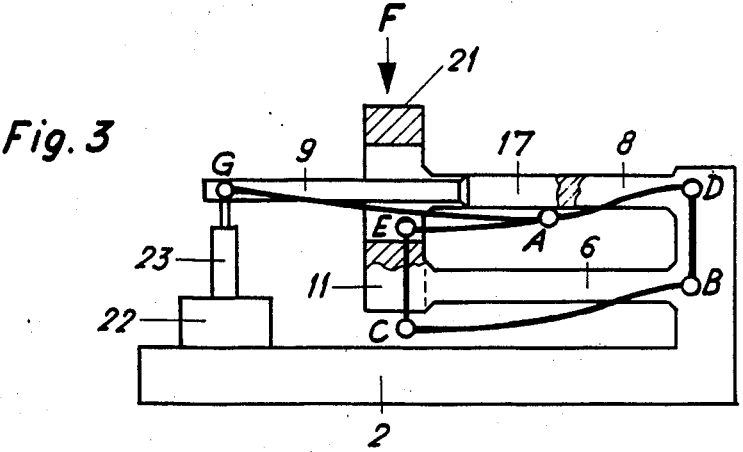
FIG. 3 shows a partial cross-section of this embodiment.

This meter works as follows. When a load i.e. the weight of a mass or a force represented by vertical arrow F acts on the loading surface 21, the main part of this load, for instance 99% is compensated by the flat spring 6 and strips 14, 15 and 16 of flat spring 8. These flat springs 6 and 8 take on a S-shaped form as illustrated in FIG. 3 by curves BC and DE. The middle part of flat spring 8 (around point A) is lowered and rotated counter-clockwise so that the right-hand end (as seen in FIG. 2) of transmission member 9 is also rotated. Its vertical position is fixed at point G by the rigid rod 23. The transmission member 9 must therefore be flexed and exert a force, called the measuring force, on the measuring system 22. This measuring force represents for example 1% of the load.

A second embodiment is represented in FIG. 4-8. The block shown in FIG. 4 comprises the components 24 to 29 each of which implements one or more elements of the meter as described below.

Component 24 forms a strong, massive connecting part 30 the function of which will be explained later.

Component 25 implements three flat springs 31, 32, 33 as part of two sets of guiding means as well as parts 34 and 35, each forming a part of a transmission members 36 and 37, respectively.

Component 26 implements three flat springs 38, 39, 40 as part of two sets of guiding means as well as parts 41 and 42, each forming a part of a transmission members 43 and 44, respectively.

Component 27 implements a frame 45, a two-part load support 46, 47 as well as parts of the transmission members 36, 37, 43, 44.

Component 28 implements parts of the transmission members 36, 37 and component 29 implements parts of the transmission members 43, 44.

In order to form the three flat springs 31, 32, 33 and parts 34, 35 of the transmission members 36, 37 two inner grooves 48 and two outer grooves 49 are milled in component 25. The inner grooves 48 are curved toward the outside (FIG. 6) delimiting thereby three flat springs 31, 32 and 33 which are fitted to connecting part 30 and to component 27. The width of flat spring 33 equals the sum of the widths of flat springs 31 and 32. parts 34, 35 of transmission members 36, 37 are thereby connected to flat springs 31 and 32, respectively.

In order to form the three flat springs 38, 39, 40 and parts 41, 42 of the transmission members 43, 44 two inner grooves 50 and two outer grooves 51 are milled in component 26. The outer grooves 51 are curved toward the inside (FIG. 5) delimiting thereby the three flat springs 38, 39 and 40. The width of flat spring 40 equals the sum of the widths of flat springs 38, 39. These flat springs 38, 39, 40 are fitted in connecting part 30 and in component 27. Parts 41, 42 are thereby connected to flat spring 40.

Grooves 48, 49 and 50, 51 lay pairwise substantially in the same vertical plane.

Component 27 exhibits four vertical cuts 52-55 which coincide with said vertical planes. These cuts delimit : the frame 45, the load support consisting of parts 46, 47 and parts 58, 59, 60, 61 of transmission members 36, 37, 43 and 44, respectively.

Component 28 implements the ends of transmission members 36, 37 and component 29 implements the ends of transmission members 43, 44.

The whole meter, except the measuring system, consists of the following elements:
- a frame 45 fixed to a suitable basis (not shown),
- a first guiding means consisting of flat springs 33 and 40 which guide the connecting parallely relatively to frame 45,
- a second guiding means consisting of flat springs 31, 38 and 32, 39 which guide parts 46, 47, respectively, to the two-part load support relatively to connecting part 30, thereby ensuring also that these parts 46, 47 are guided parallely relatively to frame 45,
- four resilient transmission members 36, 37, 43 and 44 each of which is formed by parts of components 24, 25 and 26 respectively, 27, 28 and 29, respectively.

A measuring system 62 is fixed to two rigid rods 63, 64 which are connected to the ends of the transmission members 36, 37 and 43, 44, respectively. This connection also sets the vertical position of the ends of the transmission members relatively to each other.

Figure 8:
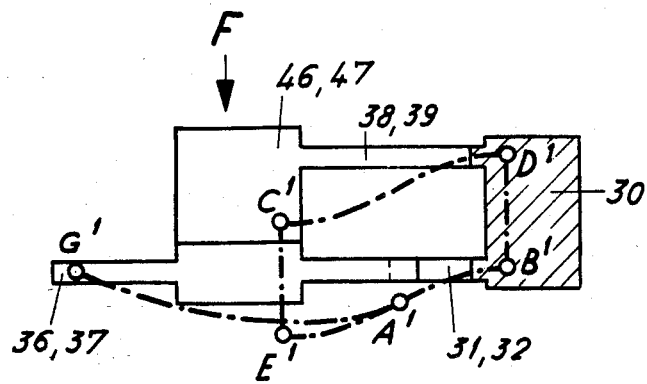

FIG. 7 and 8 illustrate schematically how this meter works. FIG. 7 shows the behaviour of the different elements of the meter along flat springs 33, 40 and frame part 45 and FIG. 8 along flat springs 31, 38 and frame parts 46, 47 when the meter is loaded. As described above for the first embodiment, flat springs pairs 31, 38 and 32, 39 and 33, 40 compensate the main part of the load F acting on parts 46, 47. These flat springs take on an S-shaped form as shown by lines BC, DE, B'C', D'E'. The middle part of flat spring 40 (around point A) goes up and is rotated clockwise so that the right-hand ends (as seen in FIG. 7) of the transmission members 43, 44 are also rotated. The middle parts (around point A') of flat springs 31, 32 are lowered and rotated counterclockwise so that to be right-hand ends (as seen in FIG. 8) of transmission members 36, 37 also rotate. As the vertical positions of these ends (points G and G') are fixed by rods 63, 64 they cannot be moved. The flexed transmission members 36, 37, 43, 44 exert a pulling force, called the measuring force, on the measuring system which is proportional to the load but equals at most 1% of it.

In FIG. 9 a variant of the cross-section of the block of FIG. 4 is shown in which components 25, 26 are oblique. This is convenient to achieve a low height of the meter. When the pairs of guides formed by flat springs 33, 40, 31, 38, 32, 39 are parallel and horizontal, and in addition near to each other, their resilience in longitudinal direction may have an influence on the accuracy of the measurement which is then no more independent from the position of the load on the load support. The oblique disposition of these guides eliminates this problem.

We claim:

1. In a mass and force meter with a single extruded profiled block and a motionless measuring system, said block presenting in cross-section several components which form a frame, a load support, a means for guiding said load support parallely and vertically, and a resilient transmission member that transmits a part of the load to the measuring system, said means consisting of at least two flat springs mounted one above the other, said flat springs being fitted in said frame and in said load support, said transmission member consisting of parts from three different components of said block, one of said components comprising three strips forming parts of one of said flat springs and one strip forming a part of said transmission member.

2. In a mass and force meter with a single extruded profiled block and a motionless measuring system, said block presenting in cross-section several components which form a frame, a load support, a means for guiding said load support parallely and vertically, and a resilient transmission member that transmits a part of the load to the measuring system, said means consisting of at least two flat springs mounted one above the other, said flat springs being fitted in said frame and in said load support, one of said components of said block comprising three strips forming parts of one of said flat springs and one strip forming a part of said transmission member, another one of said components forming said load support and another part of said transmission member, a further component forming said frame and still another component forming a further part of said transmission member.

3. In a mass and force meter with a single extruded profiled block and a motionless measuring system, said block presenting in cross-section several components which form a frame, a two-part load support, a means for guiding said load support parallely and vertically, a connecting member and a resilient transmission member that transmits a part of the load to the measuring system, said means consisting of two flat springs for guiding said connecting part relatively to said frame and of two pairs of flat springs guiding said load support relatively to said connecting part, said flat springs connecting said frame and said load support.

4. In a mass and force meter with a single extruded profiled block and a motionless measuring system, said block presenting in cross-section several components which form a frame, a load support, a means for guiding said load support parallely and vertically, and a resilient transmission member that transmits a part of the load to the measuring system, said means consisting of at least two flat springs mounted one above the other, but not parallel to each other, said flat springs connecting said frame and said load support.

5. In a mass and force meter with a single extruded profiled block and a motionless measuring system, said block presenting in cross-section several components which form a frame, a load support, a means for guiding said load support parallely and vertically, and a resilient transmission member that transmits a part of the load to the measuring system, said means comprising at least two flat springs mounted one above the other, said flat springs connecting said frame with said load support, wherein at least two of said flat springs mounted one above the other are formed by different cross-sectional components which are separated in cross-section by an interspace which extends in the longitudinal direction of the profile of the block, and wherein at least a first part of said transmission member and at least one of said flat springs consist of portions of the same cross-sectional component, said parts of said transmission member and flat springs being separated by slots.

6. In a mass and force measuring meter as claimed in claim 5, wherein said transmission member comprises a second part consisting of a portion of a component of which at least another portion forms at least a part of the load support.

7. In a mass and force meter as claimed in claim 6, wherein said transmission member further comprises a third part formed by a part of one of said cross-sectional components and wherein this cross-sectional component forms exclusively said part of said transmission member.

8. In a mass and force meter as claimed in claim 7, wherein said third part of said transmission member penetrates a hole of the load support.

9. In a mass and force meter as claimed in claim 5, wherein said flat springs and said transmission member are arranged and dimensioned in such a way that the main part of a load acting on the load support is compensated by the flat springs such that only a minor part of this load is transmitted to said measuring system.

10. In a mass and force meter as claimed in claim 5, wherein said interspace between said cross-sectional components extends in the direction of the profile over the entire block.

* * * * *